April 10, 1956 R. E. RISLEY 2,741,497
LOCK COUPLING
Filed Aug. 8, 1950
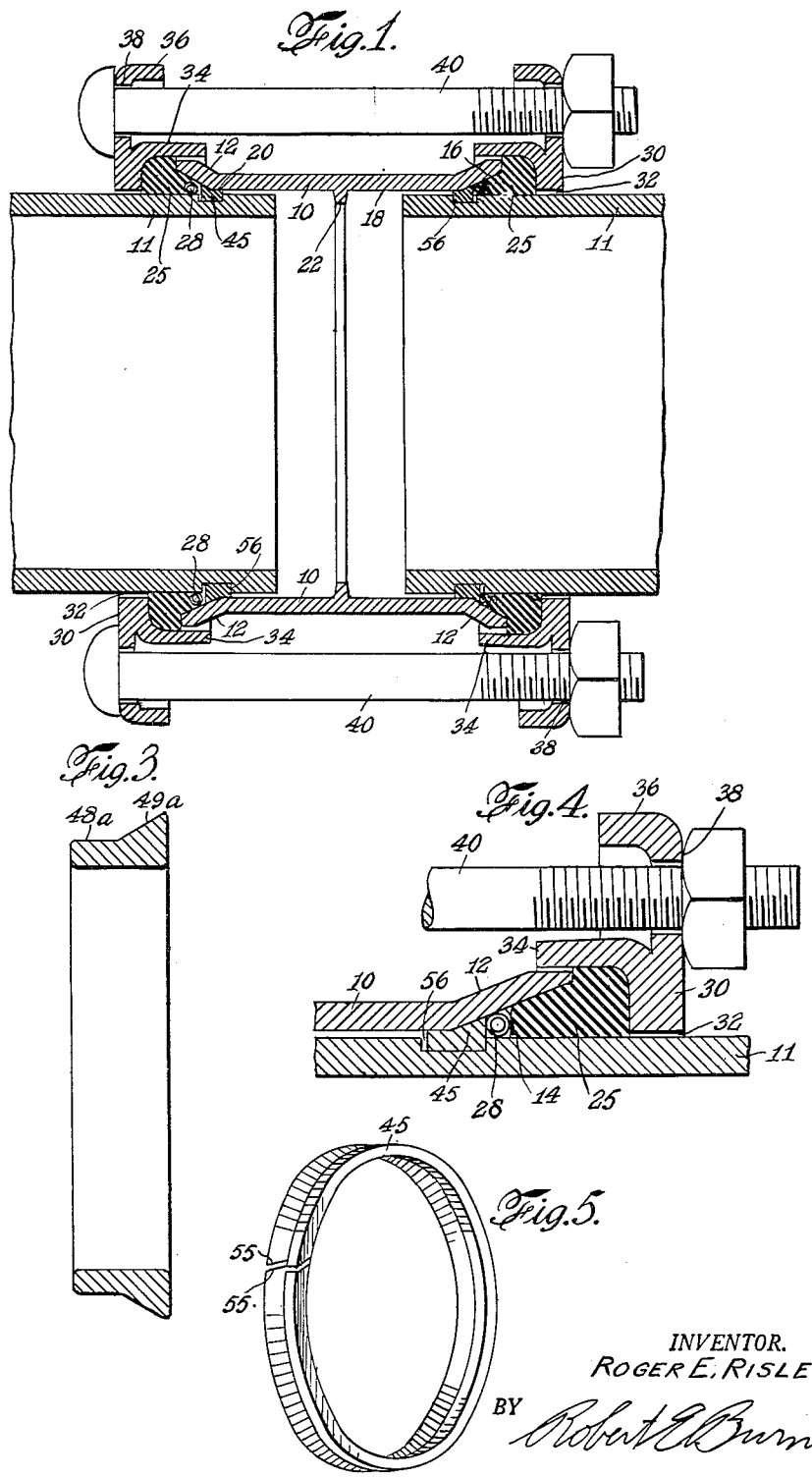
INVENTOR.
ROGER E. RISLEY
BY Robert E. Burns
ATTORNEY.

United States Patent Office 2,741,497
Patented Apr. 10, 1956

2,741,497

LOCK COUPLING

Roger E. Risley, Bradford, Pa., assignor to Dresser Industries, Inc., Dallas, Tex., a corporation of Pennsylvania Application August 8, 1950, Serial No. 178,206

9 Claims. (Cl. 285—142)

This invention relates to couplings for joining sections of pipe, tubing, and like fluid conduits, hereinafter referred to generically as "pipe," and is more particularly concerned with snap ring lock couplings for connecting sections of threaded or unthreaded pipe in flexible fluid-tight relationship effective to withstand longitudinal stress and prevent outward axial displacement of the pipe sections.

Compression couplings, for example the well-known Dresser couplings, are widely used for joining sections of pipe in the construction of long distance pipe lines for the transmission of oil, gas, water, and other pumpable fluids. These couplings generally comprise a tubular sleeve or "middle ring" and sealing gaskets which are compressed into fluid-tight engagement with the sleeve and the external surface of the pipe being joined by means of followers drawn against the ends of the sleeve by bolts or similar means. While this type of coupling is highly satisfactory in most pipe line installation, the engagement between the coupling and the pipe sections is effected through the frictional contact with the gaskets and in certain types of installations where appreciable longitudinal stresses are encountered these stresses are sometimes sufficient to overcome the frictional forces between the pipe surfaces and the gasket with the result that partial or complete withdrawal of the pipe from the coupling may occur. For this type of installation, therefore, it has been proposed to use lock couplings which include means for effecting a positive locking engagement with the pipe sections and thereby relieving the gaskets from strain when the pipe is subjected to longitudinal stresses which would tend to withdraw it from the coupling. One effective lock coupling which has been proposed involves the use of a so-called "snap ring," which is a resilient split metal ring adapted to be slipped over the ends of the pipe and to be seated in an external annular groove formed in the pipe a short distance inwardly from the pipe end.

While snap ring couplings have thus been proposed to meet this special requirement in pipe installations, these prior proposals have generally involved a special type of coupling or, at least, a special type of sleeve or middle ring specifically formed to make suitable engagement with the snap rings, which are ordinarily of rectangular cross-section. Thus, couplings have been proposed which comprise tubular sleeves provided with various special ribs and recesses which serve to guide the snap rings. Since, however, in long distance pipe line installations a lock coupling is required only in certain stretches of the line, and the balance of the pipe sections are joined by the usual compression coupling, the special construction of the lock coupling has necessitated the stocking and handling of at least two different types of couplings. This increases both the cost of installation and the cost of subsequent maintenance. Furthermore, the snap ring lock couplings heretofore proposed have been of rather complicated construction and have required relatively skilled labor for their proper installation. This has also, of course, had a tendency to increase the cost of construction of pipe lines.

It is an object of the present invention to provide a snap ring lock coupling of simplified construction.

It is another object of the invention to provide a snap ring lock coupling which does not require a special form of sleeve or middle ring.

It is another object of the invention to provide a snap ring lock coupling which may be rapidly and efficiently installed by unskilled labor.

It is another object of the invention to provide a snap ring which may be used with a conventional compression type coupling to form a lock coupling.

It is a further object of the invention to provide a coupling of the character indicated which is free from the deficiencies of prior snap ring lock couplings.

According to the invention, I provide a coupling formed from a tubular sleeve or middle ring comprising a central portion and flared end portions which provide a gasket recess at each end of the tubular sleeve for receiving gaskets which are compressed inwardly by follower rings, and a locking snap ring having an outer periphery shaped to conform to the inner peripheral surface of the sleeve at the inner ends of the gasket recesses. Preferably, the sleeve or middle ring has a substantially internally cylindrical central portion. In the preferred embodiment of my coupling I provide gaskets having an expansible ring for engagement with the locking snap ring.

It is a feature of my coupling that no special recesses or ribs on the middle ring are necessary for engagement with the snap ring and that, therefore, the sleeve may be of simple design.

It is another feature of the invention that the coupling may be installed rapidly without special tools and by unskilled labor.

Other objects and features of the invention will be apparent from the following detailed description thereof and from the drawings, wherein, Fig. 1 is a sectional view through a pipe line joint provided with a coupling embodying features of the present invention;

Fig. 2 is a sectional view of the snap ring forming a part of the coupling;

Fig. 3 is a similar view of a modified form of snap ring;

Fig. 4 is an enlarged sectional view of the snap ring in relation to the gasket and sleeve; and Fig. 5 is a perspective view of the snap ring shown in Fig. 3.

Referring to the drawings, and particularly to Fig. 1, the numeral 10 designates the sleeve or middle ring of the coupling of the invention. Sleeve 10, which as shown, is adapted to encircle pipe sections 11, is substantially tubular in form and has its ends 12 flared outwardly to provide gasket recesses 14, each having an inwardly tapered wall 16 joining the inner tubular wall 18 of sleeve 10 at pipe aperture 20. In the embodiment illustrated, sleeve 10 is provided with a frangible centering stop 22 which is shown as an inwardly projecting annular rib, the stop 22 assists in centering the sleeve 10 upon the ends of the pipe sections to be joined.

Fluid-tight sealing of the coupling against the exterior surface of the pipe sections to be joined is effected by means of compressible gaskets 25. The gaskets 25 are formed from rubber or rubber composition, this term being used generically to include natural and synthetic rubbers, and other elastomeric compounds or compositions having like properties and characteristics. The material is relatively firm and solid but sufficiently resilient and elastic to flow under pressure to conform to the surfaces between which it is confined. Preferably, the gaskets 25 are formed to fit the gasket recesses 14, i. e., having a substantially wedge-shaped or triangular cross-section, although such form is not absolutely necessary and gaskets of other cross-sectional form may be used.

For reasons that will be apparent as the description proceeds, extrusion of the gasket material through the pipe aperture 20, which may occur when the coupling is applied under some conditions, is generally undesirable. In accordance with the preferred embodiment of my invention however, such extrusion is prevented by providing at the inner end or "toe" of the gasket an expansible metallic ring 28 which normally fits closely the outer surface of the pipe. The expansible ring 28 is preferably combined with the gasket 25 in a singular unitary structure and advantageously has the form of an annular armor helix which is molded into the rubber composition of the gasket by known molding means. The endless helix 28 may be wound of wire or otherwise formed and has successive turns substantially in contact with one another. The ring 28 is preferably imbedded in the gasket so as to be substantially flush with the inner or pipe engaging face of the gasket and also with the outer end face. When the gasket is compressed, the expansible ring is forced between the tapered wall 16 and the surface of pipe section 11 and thus effectively closes any gap between the surface of the pipe 11 and the pipe aperture 20 and prevents extrusion of the rubber material of the gasket into the pipe aperture. Not only does the ring 28 thus prevent extrusion of the gasket material but it also protects the material of the gasket from gasoline, oil, or other like rubber-attacking fluid which may be carried by the pipe. Furthermore, the ring 28 also cooperates with the snap ring to improve its locking action, as will be described below. While, as I have indicated, I prefer to perform the expansible ring 28 as an integral part of the gasket 25 as shown in Fig. 1, it may, if desired, be formed separately, as shown in Fig. 4. In Fig. 1 I have illustrated the use of the gasket 25 both with and without the expansible ring 28.

The gasket 25 is compressed into sealing fluid-tight relationship with pipes 11 and sleeve 10 by means of clamping rings or followers 30. In the embodiment shown, the followers are annular in structure, each being formed with a pipe aperture 32 and an inwardly extending annular flange 34 which is adapted to slip over the outer surface of the flared ends 12 of sleeve 10 to enclose the gasket 25. The followers 30 are also formed with a reinforcing flange 36 in which are formed a series of apertures 38 adapted to receive bolts 40 for drawing the followers 30 together against the ends of sleeve 10 to compress gaskets 25 into sealing engagement when the coupling is installed.

The locking of the coupling with respect to the ends of pipe sections 11 is effected by means of the previously-mentioned snap rings 45 which are adapted to be seated in the annular grooves 42 in pipe sections 11. Each of snap rings 45 has an outer peripheral surface which is dimensioned to conform to the internal surface of middle ring 10 adjacent the pipe aperture 20. Referring to Fig. 2, which shows an illustrative embodiment of a snap ring according to my invention, the outer peripheral surface of the ring 45 is formed with a horizontal portion 48 and an inclined or tapering portion 49 forming an obtuse angle A with the horizontal portion 48. The size of the angle A will vary with the degree of flaring imparted to the ends 12 of middle ring 10, but in practice the angle A is generally between 20 and 45 degrees. The snap ring 45 thus has a wide axial face 52 and a narrow opposite face 53. As shown in Fig. 5 the ring 45 is a so-called split ring having spaced ends 55 which permit the ring to be compressed and expanded radially. The ring may be formed from spring steel or other like hard but resilient material. In Fig. 3 there is shown a slightly modified form of snap ring having an inclined portion 49a similar to portion 49 and a horizontal portion 48a of lesser axial width than portion 48.

As shown in Figs. 1 and 4, the snap ring 45, which in the installed coupling is seated in an annular groove 56 in pipe section 11, engages both the inner cylindrical wall 18 of middle ring 10 and the tapering conical surface 16 adjacent the pipe aperture 20. The wider face 52 of ring 45 engages the helical ring 28 and continuously bears against it. It will be apparent by reference to Fig. 1 that the tapered peripheral surface 49 of snap ring 45 will engage the tapered wall 16 of gasket recess 14 when pipe 11 is subjected to inward longitudinal stress and by simultaneous engagement with the radial wall of groove 56 in pipe 11 will thus resist inward movement of the pipe. Likewise, upon the occurrence of outward, longitudinal stress upon pipe 11 the face 52 of snap ring 45 will press against helical gasket ring 28 and tend to further compress the gasket 25 against follower 30 and thus outward longitudinal movement of the pipe will be effectively resisted. Even in the event the resistance of the gasket 25 should be overcome, mechanical engagement of helical ring 28 and the face 52 of snap ring 45 with the wall of follower 30 will effectively prevent withdrawal of pipe 11 from the coupling and without breaking the fluid-tight seal of gasket 25.

It will be observed that middle ring 10 is of a simple, easily-fabricated design which may be readily cast or machined in accordance with known methods, and that in combination with gaskets 25 and followers 30 it forms an effective, compression-type coupling. To convert this coupling into an equally effective lock coupling, it is merely necessary to employ the snap ring 45 using previously grooved pipe, or grooving the pipe as required for any snap ring coupling. I thus provide a coupling of general utility which may be used for coupling the sections of a pipe line in stretches where ordinary service conditions will be encountered and which may also be used for coupling the pipe sections in stretches where a lock coupling is required.

The snap ring 45 is readily manufactured and is a minor item of expense compared with the cost of prior commercial lock couplings, yet, it permits the rapid and easy conversion of a non-locking compression type coupling into an effective lock coupling.

The installation of my coupling may be effected rapidly and by relatively unskilled labor. It is merely necessary to slip the followers 30 and gaskets 25 over the ends of pipe sections 11, to seat the snap rings 45 in the grooves 56 and then to draw the followers 30 against the ends 12 of middle ring 10 by means of follower bolts 40. The joint may be uncoupled with equal facility and without danger to the coupling merely by removing the bolts 40 and pulling the pipes 11 out of middle ring 10.

While I have shown and described my invention with reference to certain preferred embodiments thereof, it will be apparent that various changes may be made without departing from the scope of the invention as defined in the appended claims and it is intended, therefore, that all matter contained in the foregoing description and in the drawings shall be interpreted as illustrated and not in a limiting sense.

What I claim and desire to secure by Letters Patent is:

1. In a compression locking coupling adapted to be lockingly engaged with a section of a pipe line having an external circumferential groove formed therein but to permit limited axial movement of said section, in combination, a tubular sleeve having a central portion and a flared end, said end having an inner surface inclined with respect to the inner surface of said central portion and defining a gasket recess, a packing gasket receivable in said recess, a follower member for applying sealing pressure to said gasket, and a snap ring adapted to be seated in said sleeve at the juncture of the central portion and the flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, and the outer peripheral surface of said snap ring being shaped to conform to the internal surface of said sleeve at said juncture and having outer surfaces portions of different slope.

2. In a compression locking coupling adapted to be lockingly engaged with a section of a pipe line having an external circumferential groove formed therein but to permit limited axial movement of said section, in combination, a tubular sleeve having a central portion and a flared end, said end having an inner surface inclined with respect to the inner surface of said central portion and defining a gasket recess, a packing gasket receivable in said recess, a follower member for applying sealing pressure to said gasket, and a snap ring adapted to be seated in said sleeve at the juncture of the central portion and the flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, and the outer peripheral surface of said snap ring being shaped to conform to the internal surface of said sleeve at said juncture, the outer peripheral surface of said snap ring comprising a horizontal surface parallel to the axis of the ring and engageable with the internal surface of the central portion and a tapering surface engageable with the flared end adjacent said juncture.

3. In a compression locking coupling adapted to be lockingly engaged with a section of a pipe line having an external circumferential groove formed therein but to permit limited axial movement of said section, in combination, a tubular sleeve having a central portion and a flared end, said end having an inner surface inclined with respect to the inner surface of said central portion and defining a gasket recess, a packing gasket receivable in said recess, a follower member for applying sealing pressure to said gasket, an expansible metallic ring at the inner end of said gasket, and a snap ring adapted to be seated in said sleeve at the juncture of the central portion and the flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, and the peripheral surface of said snap ring being shaped to conform to the internal surface of said sleeve at said juncture and having outer surface portions of different slope.

4. In a compression locking coupling adapted to be lockingly engaged with a section of a pipe line having an external circumferential groove formed therein, in combination, a tubular sleeve having a central portion and flared ends integral therewith, each end having an inner surface inclined with respect to the inner surface of said central portion and defining a gasket recess, a wedge-shaped packing gasket receivable in said recess, a follower member for applying sealing pressure to said gasket, an expansible metallic ring at the inner end of said gasket, and a snap ring adapted to be seated in said sleeve at the juncture of the central portion and the flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, the peripheral surface of said snap ring being shaped to conform to the internal surface of said sleeve at said juncture and having outer surface portions of different slope.

5. In a compression locking coupling adapted to be lockingly engaged with a section of a pipe line having an external circumferential groove formed therein, in combination, a tubular sleeve having a central portion and flared ends integral therewith, each end having an inner surface inclined with respect to the inner surface of said central portion and defining a gasket recess, a wedge-shaped packing gasket receivable in said recess, a follower member for applying sealing pressure to said gasket, an expansible metallic ring at the inner end of said gasket, and a snap ring adapted to be seated in said sleeve at the juncture of the central portion and the flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, the outer peripheral surface of said snap ring comprising a horizontal surface parallel to the axis of the ring and engageable with the internal surface of the central portion and a tapering surface engageable with the flared end adjacent said juncture.

6. In a pipe joint, the combination with a pipe having an external circumferential groove formed therein of a compression coupling lockingly engaged with said pipe but permitting limited axial movement of said pipe, said coupling comprising a sleeve member having a central portion for receiving the pipe and a flared end having an inner surface inclined with respect to the inner surface of said central portion and defining a gasket recess, a packing gasket in said recess, follower means for applying sealing pressure to said gasket, and a snap ring seated in said pipe groove substantially at the juncture of said central portion and said flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, and the outer peripheral surface of said snap ring being shaped to conform to the internal surface of said sleeve adjacent the juncture of said central portion and said flared end and having surface portions of different slope.

7. In a pipe joint, the combination with a pipe having an external circumferential groove formed therein of a compression coupling lockingly engaged with said pipe but permitting limited axial movement of said pipe, said coupling comprising a sleeve member having a central portion for receiving the pipe and a flared end having an inner surface inclined with respect to the inner surface of said central portion and defining a gasket recess, a packing gasket in said recess, follower means for applying sealing pressure to said gasket, an expansible metallic ring at the inner end of said gasket, and a snap ring seated in said pipe groove substantially at the juncture of said central portion and said flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, and the outer peripheral surface of said snap ring being shaped to conform to the internal surface of said sleeve adjacent the juncture of said central portion and said flared end and having outer surface portions of different slope.

8. In a pipe joint, the combination with a pipe having an external circumferential groove formed therein of a compression coupling lockingly engaged with said pipe but permitting limited axial movement of said pipe, said coupling comprising a sleeve member having a central portion for receiving the pipe and a flared end having an inner surface inclined with respect to the inner surface of said central portion and defining a gasket recess, a packing gasket in said recess, follower means for applying sealing pressure to said gasket, an expansible metallic ring at the inner end of said gasket, and a snap ring seated in said pipe groove substantially at the juncture of said central portion and said flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, the outer peripheral surface of said ring comprising a horizontal surface parallel to the axis of the snap ring and engageable with the internal surface of the central portion of the sleeve and a tapering surface engageable with the flared end adjacent said juncture.

9. In a pipe joint, the combination with a pipe having an external circumferential groove formed therein of a compression coupling lockingly engaged with said pipe but permitting limited axial movement of said pipe, said coupling comprising a sleeve member having an internally cylindrical central portion for receiving the pipe and a flared end having an inner surface inclined with respect to the inner surface of said central portion and defining a gasket recess, a wedge-shaped packing gasket in said recess, follower means for applying sealing pressure to said gasket, an expansible metallic ring at the inner end of said gasket, and a snap ring seated in said pipe groove substantially at the juncture of said central portion and said flared end, said snap ring having a portion of greater radial thickness and a portion of lesser radial thickness, the portion of greater radial thickness being adjacent and engageable with said gasket and the portion of lesser radial thickness being received in the end of said central portion of said tubular sleeve, and the outer peripheral surface of said snap ring being shaped to conform to the internal surface of said sleeve adjacent the juncture of said central portion and said flared end, the outer peripheral surface of said snap ring comprising a horizontal surface parallel to the axis of the snap ring and engageable with the internal surface of the central portion of the sleeve and a tapering surface engageable with the flared end adjacent said juncture.

References Cited in the file of this patent

UNITED STATES PATENTS

| | | |
|---|---|---|
| 459,907 | Hogan | Sept. 22, 1891 |
| 1,240,486 | Price | Sept. 18, 1917 |
| 1,888,260 | Clark | Nov. 22, 1932 |
| 2,398,399 | Alexander | Apr. 16, 1946 |
| 2,531,922 | Seamark | Nov. 28, 1950 |

FOREIGN PATENTS

| | | |
|---|---|---|
| 42,519 | France | May 8, 1933 |
| 913,833 | France | June 3, 1946 |
| 51,826 | Netherlands | Aug. 15, 1941 |